United States Patent [19]

Ho

[11] Patent Number: 5,615,373

[45] Date of Patent: Mar. 25, 1997

[54] DATA LOCK MANAGEMENT IN A DISTRIBUTED FILE SERVER SYSTEM DETERMINES VARIABLE LOCK LIFETIME IN RESPONSE TO REQUEST TO ACCESS DATA OBJECT

[75] Inventor: Lawrence Y. Ho, Morgan Hill, Calif.

[73] Assignee: International Business Machines Corporation, Armonk, N.Y.

[21] Appl. No.: 112,163

[22] Filed: Aug. 26, 1993

[51] Int. Cl.⁶ .................................................. G06F 17/30
[52] U.S. Cl. .................................... 395/726; 395/200.09
[58] Field of Search ................... 395/275, 650, 395/600, 725, 425, 726, 856, 200.09

[56] References Cited

U.S. PATENT DOCUMENTS

| | | | |
|---|---|---|---|
| 4,716,528 | 12/1987 | Crus et al. | 364/300 |
| 4,965,719 | 10/1990 | Shoens et al. | 364/200 |
| 4,979,105 | 12/1990 | Daly et al. | 395/575 |
| 5,060,144 | 10/1991 | Sipple et al. | 395/650 |
| 5,095,421 | 3/1992 | Freund | 395/650 |
| 5,161,227 | 11/1992 | Dias et al. | 395/650 |
| 5,247,672 | 9/1993 | Mohan | 395/650 |
| 5,339,427 | 8/1994 | Elko et al. | 395/725 |
| 5,459,862 | 10/1995 | Garliepp et al. | 395/600 |

OTHER PUBLICATIONS

Belady et al. "Time–Dependent Data–Locking Mechanism" IBM Technical Disclosure Bull., No. 11 Apr. 1977.

H. Stugis, J. Mitchell and J. Israel, "Issues in the Design and Use of a Distributed System," Operating Systems Review, Jul. 1980, pp. 55–69.

*Primary Examiner*—Thomas C. Lee
*Assistant Examiner*—D. Dinh
*Attorney, Agent, or Firm*—Baker, Maxham, Jester & Meador

[57] ABSTRACT

In a distributed file system having a plurality of file servers each associated with a plurality of workstations having cache memories, data locks granted by the file servers to the workstations have variable lock lifetimes that are selected based on system parameters. The parameters selected to determine lock lifetimes can be either statically determined, in which case system operating parameters such as read/write ratio for data objects are assumed, or can be dynamically determined, in which case real-time system operating parameters such as current read/write ratios are used to determine the appropriate lock lifetime.

19 Claims, 6 Drawing Sheets

DATA LOCK MANAGEMENT IN A DISTRIBUTED FILE SERVER SYSTEM DETERMINES VARIABLE LOCK LIFETIME IN RESPONSE TO REQUEST TO ACCESS DATA OBJECT

BACKGROUND OF THE INVENTION

1. Field of the Invention

This invention relates to distributed file server systems and, more particularly, to cache memory data lock management for such systems.

2. Description of the Related Art

Computing systems consisting of workstations or terminals connected to a central computer or mainframe by a fast local area network have become widespread. Such systems are used for executing general office tasks, engineering design, software development, and many other applications. Future systems promise to provide an information processing environment that will include thousands of workstations, as well as many mid-size machines or mainframes, all interconnected by one or more local area networks (LANs). The workstations in such systems need to share resources, both for economic reasons and due to the nature of applications. Systems that share resources such as system hardware and software, system data, and user software and data, are known as distributed file systems.

The sharing of data objects such as data files and databases generally is administered through the use of file servers. The file servers comprise computing units that are interposed between individual workstations and the local area network. In addition to managing the sharing of resources, file servers also provide such services as automatic backup and recovery, user mobility, and management of cache workstation memories. The distributed file system allows for replication of files and/or storing data files in cache memory on various levels of storage hierarchy. A cache memory consists of a memory associated with a particular workstation in which may reside copies of data objects from a primary location of data storage, such as the file server or a mid-size machine or mainframe. The workstation carries out operations on its copy of a data object rather than on the data object maintained in the primary location of data storage. Caching of data at a workstation level, if done properly, can improve system performance because it permits data to be accessed without the intervention of the file server. Such caching, however, introduces the problem of data coherency between the cache data and the data at the primary location of data storage. Data coherency refers to insuring that only a single image of a data object exists or that the system at least performs as if only a single image exists. With large data caches, the data traffic between file servers and workstations required to maintain data coherency can be the dominant factor in effective data access time and cache performance. Most conventional approaches to data coherency fall into one of two categories, those that assume reliable broadcast, and therefore cannot tolerate communication failures, and those that require a check for consistency in every data read and therefore suffer from excessive overhead. A system preferably provides failure tolerance and therefore attempts have been made to reduce overhead while providing coherency.

Conventional cache file systems that have provided data coherency do so by utilizing data locks. When a client, such as a local workstation terminal or an application, requires access to a data object, it must request access to the data object from a file server. Conventional caching systems provide coherency by granting data locks with either a zero lifetime or an infinite lifetime. A zero lifetime lock, for example, is granted when the client workstation will immediately execute a write command upon receiving the lock and then release its data lock, thereafter providing other users with a chance to write data. An infinite lifetime lock is held by the client to whom it was granted for as long as the client desires it.

System efficiency is optimized in the case of data files that are highly shared by granting zero lifetime locks. This minimizes delay resulting from processor failures and from communication failures, such as when a data object is being accessed by one workstation at the same time access is requested by another workstation. System efficiency is improved in the case of system files, which are repeatedly accessed but rarely written, with an infinite lifetime lock. This permits client workstations to complete extended read operations without interruption.

Attempts have been made to combine the advantages of the two lock lifetime extremes. For example, Sturgis, Mitchell and Israel in the July 1980 issue of Operating Systems Review, pp. 55–69, describe a distributed file system that uses breakable locks with time limits. The locks, however, have a minimum lifetime before they can be broken. Because clients in the Sturgis et al. system are not reliably notified when a lock is broken, the system actually resembles a system with locks of zero lifetime. That is, locks are released as soon as read or write operations are completed. U.S. Pat. No. 4,716,528 to Crus describes a method for utilizing a coordinated pair of locking limits to manage data concurrency and adjust lock granularity. Again, however, all the data locks have a predetermined zero or infinite lifetime. U.S. Pat. No. 4,965,719 to Shoens describes a method for increasing throughput and maintaining page coherency in a multiple processing environment with predetermined lock lifetimes.

From the discussion above, it should be apparent that there is a need for a distributed file system in which data coherency is assured and data locks are optimal lock lifetimes that are provided for highly shared files and rarely written files. The present invention satisfies this need.

SUMMARY OF THE INVENTION

The present invention provides a method of data lock management in a distributed file system in which client workstations serviced by a file server are granted variable lifetime locks when they request access to a data object. As used herein, variable lifetime locks are locks that can assume a lifetime value in a range from zero to infinity seconds and are not limited to the endpoints of the range. The present invention permits the lock lifetimes to be determined in either a static scheme or dynamic scheme. In the static scheme, certain system parameters, such as the file read/write access ratio, the file access rate, the number of clients sharing the data object, and the number of clients served by the file server are assumed to have a predetermined value or characteristic and lock lifetimes are assigned accordingly. In a dynamic scheme of determining lock lifetime, the actual real-time system parameters are utilized to determine the lock lifetime. For example, parameters such as the file read/write access ratio, file access rate, and number of clients sharing a data object are typically calculated in real-time by a computer system in the normal course of operation. The present invention uses such readily calculated parameters to dynamically assign a variable lifetime to a lock at the time the lock is granted. Thus, the lock lifetime can be tailored to the immediate operating situation in the system.

In another aspect of the invention, client workstations having a current data lock can request renewal of their data lock prior to the expiration of the lock. For example, a workstation might be ready to execute a file backup operation that requires more time to complete than is remaining in the lifetime of the data lock. Rather than complete as much of the backup operation as possible and then compete with other users for access to the data file to complete the operation, the workstation might request a data lock renewal before the lock expires. In this way, the file backup operation is not interrupted by an access request from another workstation during the backup operation. This can reduce overhead for lock management and improves efficiency of the system.

Other features and advantages of the present invention should be apparent from the following description of the preferred embodiment, which illustrates, by way of example, the principles of the invention.

DESCRIPTION OF THE PREFERRED EMBODIMENT

Figure 1:
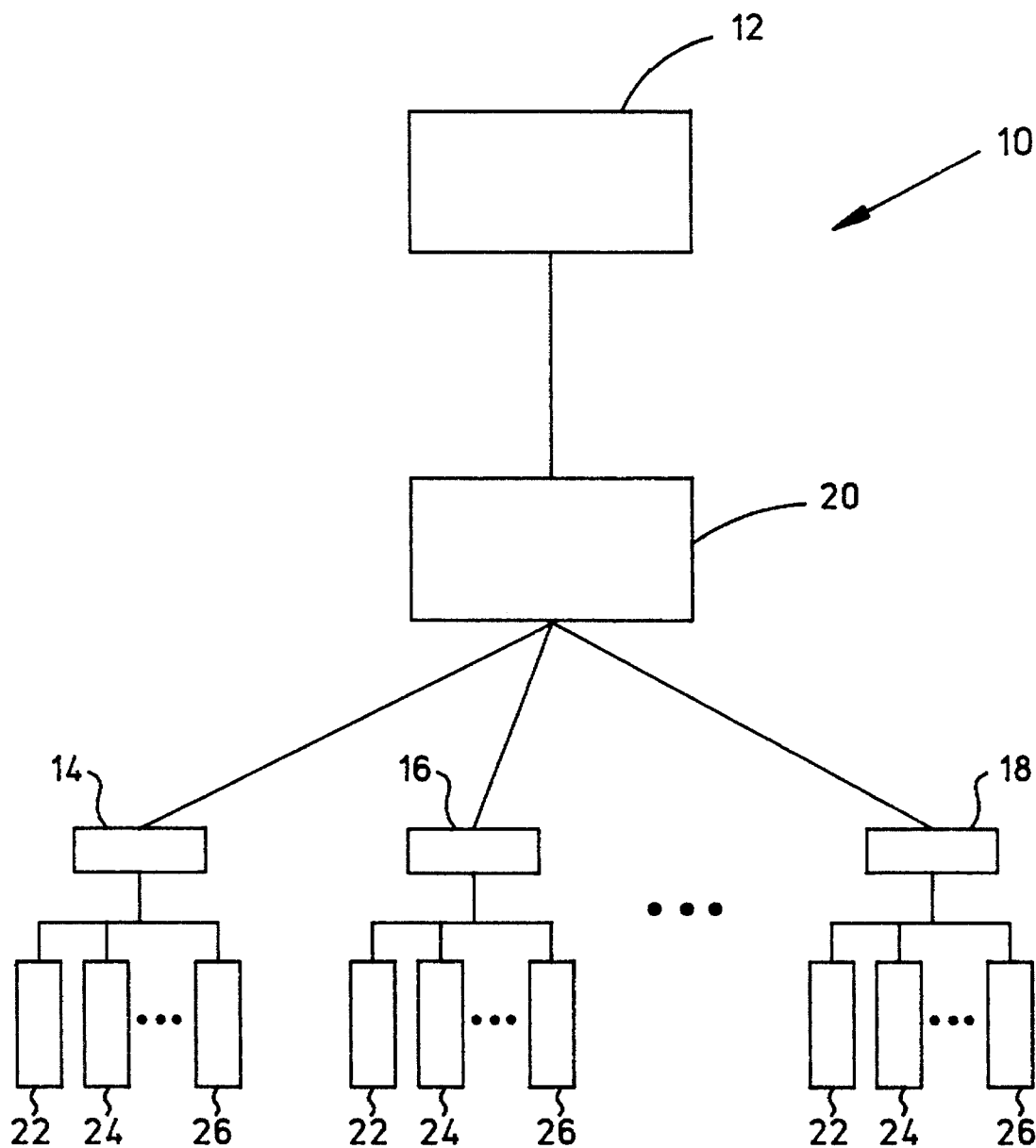
FIG. 1 is a block diagram of a computer system in accordance with the present invention, showing the plurality of file servers with client workstations all interconnected through a local area network (LAN).
Figure 2:
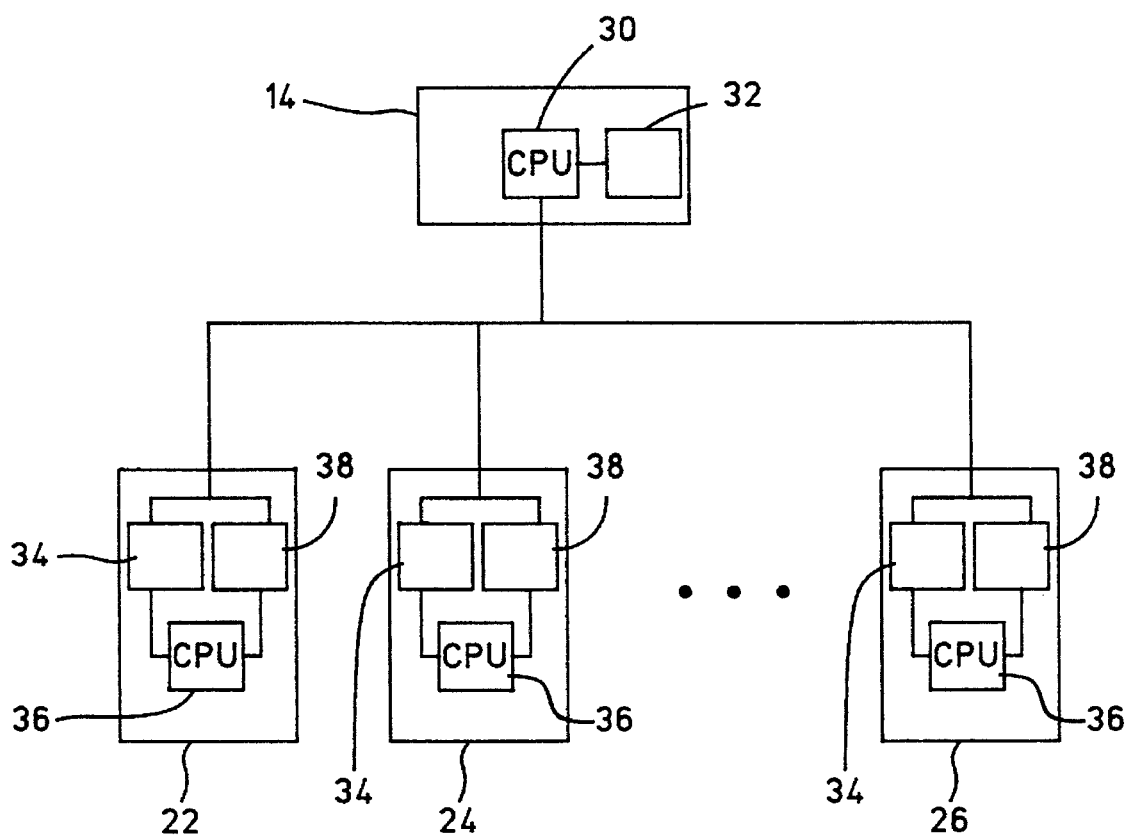
FIG. 2 is a block diagram of a file server and workstation pair of the type illustrated in FIG. 1.

With reference to FIGS. 1 and 2, a computer system 10 is shown having a central processor 12 such as an International Business Machines Corporation (IBM Corporation) System 390 product connected to a plurality of file servers such as IBM Corporation AS400 file servers, three of which 14, 16, 18 are illustrated and all of which are interconnected by a local area network (LAN) 20. Each of the file servers is associated with a plurality of client workstations such as IBM Corporation RS6000 workstations, three of which 22, 24, 26 are illustrated. The client workstations periodically request access to data objects from their respective file server. Each file server, in turn, provides copies of data objects to the client workstations if the requested data object is associated with the particular server. If the data object is associated with a different server or with the central processor 12 system memory, then the server gets the data object via the LAN 20 and provides it to the workstation.

FIG. 2 shows a particular file server 14 and its associated workstations 22, 24, 26. FIG. 2 shows that each file server includes a central processing unit (CPU) 30 and a storage memory device 32. The file server CPU controls access to the storage device, which contains data objects, and communicates with the LAN 20 and the workstations. Each workstation includes a terminal 34, such as a keyboard and monitor combination, a workstation CPU 36, and a cache memory 38. The terminal, CPU, and cache memory of the workstation are interconnected. Data objects are received and data is provided through the terminal 34 and cache memory 38.

As noted above, optimal system performance is obtained when data locks are not limited to a fixed lifetime of either zero or infinity. For example, locks with relatively short lifetimes minimize delay resulting from client and server failures and partitioning communication failures while ensuring decreasing overhead from repeated requests for locks. When a server cannot communicate with a client workstation, the file server must delay write operations to a file for which the failed client holds a data lock until that lock lifetime has expired. Short lifetimes minimize delay and reduce the storage requirements of a file server. Locks with short lifetimes also minimize false contention, which refers to a locking conflict when no actual conflict in file access exists. In particular, false contention can occur when a client writes to a file that is covered by a lock held by another client when the other client is not currently accessing the file. Zero lifetime locks, however, create excessive overhead for files that are repeatedly written. On the other hand, locks with relatively long lifetimes are significantly more efficient for the system on files that are accessed repeatedly and have relatively little sharing of write operations.

The present invention provides improved system performance by providing variable lifetime data locks. The data locks do not have predetermined lock lifetimes of either zero or infinity. Each file server 14, 16, 18 controls the lifetimes of the data locks it grants. Unlike conventional distributed file systems, the lifetime of a lock is not predetermined for all of the locks granted. Rather, the lifetime of a data lock is determined at the time the lock is granted. In accordance with the invention, the lock lifetime is determined in either a static scheme or a dynamic scheme based on system operating statistics and other parameters. The system operating statistics can include, for example, the file access rate, file read access rate, file write access rate, number of client workstations served by a file server, and number of client workstations sharing a data object. Other lock parameters can include the type of data object for which access is being requested, type of workstation requesting access, and the assigned priority of the data object or workstation.

In a static scheme, the system operating statistics are assumed to have a predetermined value and the lock lifetimes are determined based on achieving maximum efficiency for a system having the predetermined characteristics. The static scheme is static only in the sense that system operating statistics are assumed static. Other parameters, such as type of workstation and assigned priority, are dynamic and variably determine the lock lifetime. In a dynamic scheme, one or more of the system operating statistics used to determine lock lifetimes are calculated in real time. Most distributed file systems calculate the statistics that might be used to determine the lock lifetimes as part of normal system operations. Thus, overhead for the dynamic scheme is not unreasonable. The system parameters and lock lifetimes that result in maximum efficiency are best determined empirically, or through simulation methods well-known to those skilled in the art.

The present inventor has empirically determined a performance model that has been found to provide optimal results for a wide variety of systems based on system operating statistics including data file read access rate, file write access rate, and the number of client workstations sharing a file. In particular, optimal results were obtained in the case where the lock lifetime for a data file was defined to be $$t=1/(\alpha_r(f-1))$$

where $\alpha_r$ is the file read access rate and f is a lock benefit factor defined to be $$f=2\alpha_r/N_s\alpha_w$$

where $\alpha_r$ is the file read access rate, $\alpha_w$ is the file write access rate, and $N_s$ is the number of clients sharing the data file.

Returning to the operation of the system 10, when a client workstation 22, 24, 26 requires access to a data object, it provides its associated file server 14 with a read or write request, as appropriate. If, for example, a write operation is requested, the file server will check to see if another workstation has an unexpired lock on the data object. If no other workstations have a lock on the data object, and if there is no contention among workstations for access to the data object, then the file server will determine the appropriate lock lifetime and grant the lock to the requesting client workstation. For maximum efficiency, a read request will generally result in a zero or very short lock lifetime. In this way, the lock is released immediately after the read operation is finished in the case of a zero lifetime lock or very shortly thereafter in the case of a short lifetime lock. As described further below, maximum efficiency for write requests in most systems will generally result in a lock lifetime of between five and twenty seconds.

If there is contention among workstations for access to a data object, then the file server must resolve the contention, determine the appropriate lock lifetime, and grant the lock to the winning workstation. Contention can be resolved, for example, by assigning different priorities to different classes of workstations. Alternatively, contention can be resolved on a first-come, first-served basis. Other schemes for resolving contention will occur to those skilled in the art. If other workstations have unexpired locks when a client workstation requests access, then the file server will typically seek approval of the lock holding workstations before carrying out the write operation.

In the preferred embodiment, a file server 14 is free to wait for a data lock to be released instead of seeking approval of a lockholding workstation prior to a write operation. Also in the preferred embodiment, a particular workstation 22, 24, 26 is free to decide when to request a renewal of a data lock, when to release its data lock before expiration, and when to grant approval for a write request from another workstation. Those skilled in the art will appreciate when a workstation might want to request lock renewal or release its lock before expiration and will appreciate the manner in which a workstation would communicate such a request to a file server. For example, a renewal likely would be requested before a file backup operation.

The combination of file server and workstation features described above provides different trade-offs between server load and file access response time. For example, as described above, a workstation might anticipate the expiration of its data lock and request a renewal before the data file in question is accessed. This improves response time by eliminating the added delay for data read operations, but it does so at the cost of increased load for the file server. In particular, an idle workstation might continue to request extensions even when the files are not being accessed, and because the cache continues to hold locks, it may increase the amount of false contention.

The file server 14, however, can use these options to optimize the handling of system files, which account for a significant proportion of shared access operations. System files are files such as commands, header files, and libraries that are part of the standard system support software. These files are widely shared, heavily read, and only infrequently written. They are commonly characterized as accounting for a significant percentage of the total read operations and only a few of the total write operations. The handling of system files is optimized by using a smaller number of data locks to cover the files, such as one lock per major directory, and by renewing these locks through multicasting. Multicasting is providing more than one client with a lock to the same file. Although multiple files per data lock may result in a form of false contention, this effect is minimal with system files due to the extremely low write rate.

In accordance with the invention, a file server 14 can determine an appropriate lifetime for a data lock on a file-by-file and client-by-client basis. For example, requests for access to data objects that are designated system files can be optimized as described above. Optimal handling of files having other characteristics, such as being heavily shared and frequently written, rarely shared and frequently written, and others, will occur to those skilled in the art. Likewise, requests for access from client workstations can be granted lock lifetimes in accordance with the type of workstation producing the request. For example, workstations associated with important client operations might be assigned locks with longer lifetimes than workstations associated with a student learning center or library access location. Again, locks are not limited to a predetermined lifetime regardless of system operating parameters, including file type and client type. In fact, a file server 14 can set a lock lifetime based on the file access characteristics for the requested data object as well as the propagation delay to a client workstation. In particular, a heavily shared file might be given a lock with a zero lifetime. The lock lifetimes of another client workstation could be increased to compensate for the amount of time that is lost due to propagation delay and the delay incurred as a result of having to extend the lifetime of data locks.

Figure 3:
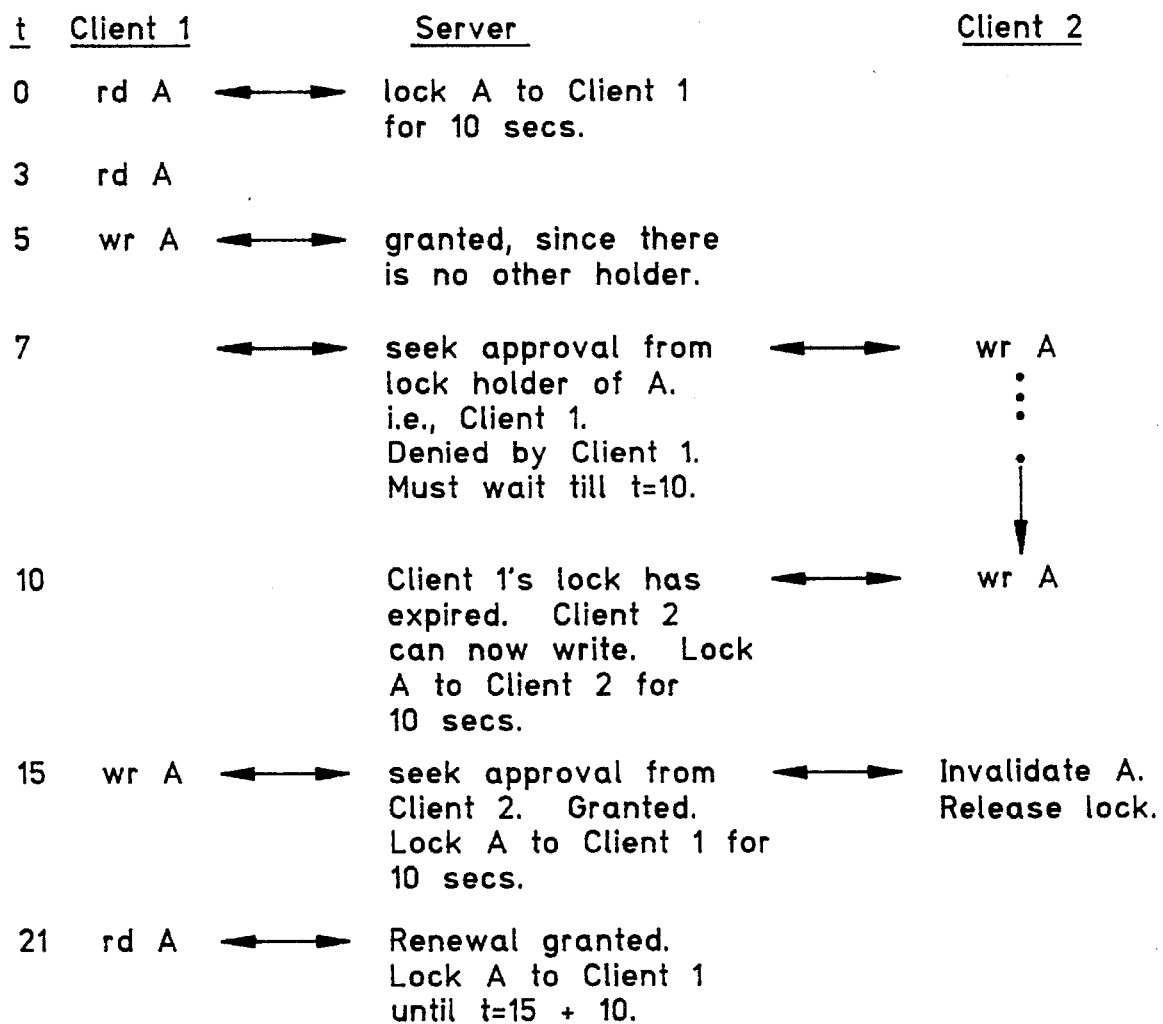
FIG. 3 is a time line illustrating operation of the system shown in FIGS. 1 and 2.

Operation of the system 10 is best illustrated with an example comprising the time line of FIG. 3. Suppose that at time t=0, the first client workstation 22 accesses a first data file or data object A in a read operation and obtains a data lock on A for a period of ten time units. The first workstation therefore reads the file A into its cache memory 38. Another read operation to the data file A by the workstation at time t=3 can use the version in the cache memory without checking with the file server 14. The next access from the workstation to the data file is a write operation that occurs at time t=5. At t=5, the workstation is the only lockholder of the data file, and therefore the file server 14 grants the write request to the first workstation 22 immediately. If there were any other workstations holding data locks on the data file A, then the file server would first obtain permission from the other lockholders before granting permission to write.

Next, suppose that the second client workstation 24 attempts to write to the data file A at time t=7. This is still within the lifetime of the data lock granted to the first workstation 22. That is, any attempted write operations by the second workstation to the data file A during the first ten seconds would require the file server 14 to obtain permission from the first workstation 22, which is holding the data lock. If communication cannot be established with the first workstation, such as the case where the first workstation is in an active mode, then the file server will simply wait until time t=10 when the first workstation data lock has expired. Thus, when the first workstation receives the write request of the second workstation through the file server at time t=7, it denies the request. Therefore, the second workstation must wait until the first workstation data lock expires.

At time t=10, the first workstation data lock on the data file A expires and a lock is now granted to the second workstation 24 for it to execute its write operation. Suppose that the lifetime of its data lock also is set to ten time units. At time t=15, suppose that the first workstation 22 requests access to write to the data file A. The file server 14 asks for permission to write from the second workstation, which grants the write request by invalidating its own copy of the data file A in its cache and releasing the data lock. The first workstation now has a data lock for ten time units. Finally, suppose that at time t=21, the first workstation is about to perform a file backup operation. In accordance with the invention, the workstation requests a lock renewal. Because there are no other pending requests for access, the renewal is granted and therefore the first workstation will be granted a second lock with a lifetime of ten further time units upon the expiration of its current data lock at time t=25.

In the preceding example, the relevant read and write operations are not limited to operations upon the contents of the data file. To support a repeated open operation, the cache must also have a directory that stores the name-to-file binding and permission information. It also needs a lock over this information to use it to perform the open operation. Similarly, modification of this information, such as renaming the file, would constitute a write operation.

The following paragraphs of pseudocode illustrate the implementation of the method of the invention. Pseudocode for both the operation of a client workstation and a file server is provided.

In the next paragraph, the pseudocode for the file server is provided. References to the "Performance_Model" refer to a determination of the appropriate lock lifetime in accordance with the example given above. Other schemes can be used and, as noted above, this determination is best carried out empirically or through simulation and can be either a static determination or a dynamic determination. In any case, the lock lifetime can vary in the range from zero to infinity.

```
PROC Server_Req ( var Reqtype: Reqtyp_ty;
                      i  : Client_id;
                      A  : File_id
               );
BEGIN
  IF write is pending for lock request approval OR
     write is pending for lock release
  THEN deny request from Client i;
  ELSE DO;
    IF (Reqtype is Read) OR
       (Reqtype is Write AND there is no lock holder on A)
    THEN use Performance_Model to determine the
         appropriate lifetime, grant lock to Client i, and
         RETURN;
    IF Reqtype is Write AND there is at least one lock
       holder of A
    THEN DO;
      FOR each lock holder of A, j=1 to
          Num_Lockholder(A) , Seek Write approval from
          client j for the write request
      IF all j's provided approval
```

-continued

```
      THEN use Performance_Model to determine the
           appropriate lifetime, grant lock to Client i,
           and RETURN;
      ELSE IF at least one client disapproved OR at least
           one client has no response (failed)
      THEN delay request until current time +
           MAX(lifetime remaining of disapproved or
                                        failedclient);
    END;
  END;
END;
```

In the pseudocode, the variable Reqtype is either a request for a read operation or a request for a write operation. "Client i" refers to a client workstation in the system 10 and "File A" refers to a data object in the system. The first IF . . . THEN clause refers to the situation where a client workstation Client i is asking for a lock on a data object File A when that file already is locked to another workstation, where a write operation is pending. That is, another client workstation has an unexpired lock on the data file for which Client i is requesting access. As a result, the file server denies the request from Client i. Alternatively, the file server can place the request from the client workstation Client i in a queue, assuming the queue is not full, and let Client i wait its turn for the data lock.

In the next IF . . . THEN clause of the pseudocode, if there is no current lockholder on the data file, then the file server 14 determines the appropriate lifetime for the lock and grants it. Next, if the access requested is a write operation and another workstation has a data lock, although no current write operation, then approval is requested from all of the clients holding data locks on the data file. If all of the lockholders approve, then the file server uses the Performance Model to determine an appropriate lifetime for the data lock and grants it to the requesting client workstation Client i. If at least one client workstation disapproved or provided no response (that is, communication failed), then the request is not acted upon but instead is delayed until the maximum of either the lifetime remaining for the lock of the disapproving client workstation or of the failed client.

The next paragraph of pseudocode illustrates the operation of a client workstation. The pseudocode covers read and write operations for a workstation.

```
PROC Client_CacheReq ( var Reqtype: Reqtype_ty;
                           i  : Client_id;
                           A  : File_id
                    );
BEGIN
  IF Reqtype is Read AND A is in the cache directory (hit)
     AND is valid
  THEN DO;
    IF A is locked THEN RETURN value of A
    ELSE /*lock has expired*/
      SIGNAL Server_Req for a lock on A;
      WAIT for response from server;
      RETURN value of A
    END;
  ELSE IF Reqtype is Read AND A is not in the cache
       directory (miss)
       THEN SIGNAL Server_Req for a Read request on A;
            WAIT for response from server;
            RETURN value of A
  ELSE IF Reqtype is Write
       THEN SIGNAL Server_Req for write approval from other
            lock holders;
            WAIT for response from server;
            RETURN value of A
  ELSE IF Reqtype is Write_Approval(A)
       THEN IF approved THEN invalidate A AND SIGNAL
```

```
    approval;
        ELSE SIGNAL disapproval;
END;
```

The first IF . . . THEN clause refers to the situation where a client workstation Client i wants to read a data object File A. If the data object File A is in the cache directory of the client workstation and the data object is valid, that is, the copy of the data object is current, then the read operation is carried out. Generally, a read operation is carried out with a lock that is granted a zero lifetime. Thus, the lock is released immediately upon the completion of the read operation. In response to the read request, if the lock has expired, then the file server is signaled to request a lock on the data file and the client workstation waits for a response from the file server. If the request is for a read operation and the data file is not found in the local cache directory, then the client workstation must signal the file server for a data lock and wait for a response.

Next, if the requested operation is a write operation, then the client workstation Client i must signal the file server for write approval from the other lockholders and wait for a response. If there are no other lockholders, the lock is granted, as described above. If the workstation already has a lock, then the request amounts to a renewal request to extend the lock lifetime, as described above. Finally, the client workstation might receive a request from the file server for write approval. That is, another client workstation wants to write to a data file for which the client workstation has a lock. Thus, the client workstation must determine if it will grant approval. If approval is granted, then the client workstation invalidates its copy of the data file and provides its approval signal to the file server. Disapproval otherwise is provided.

Figure 4:
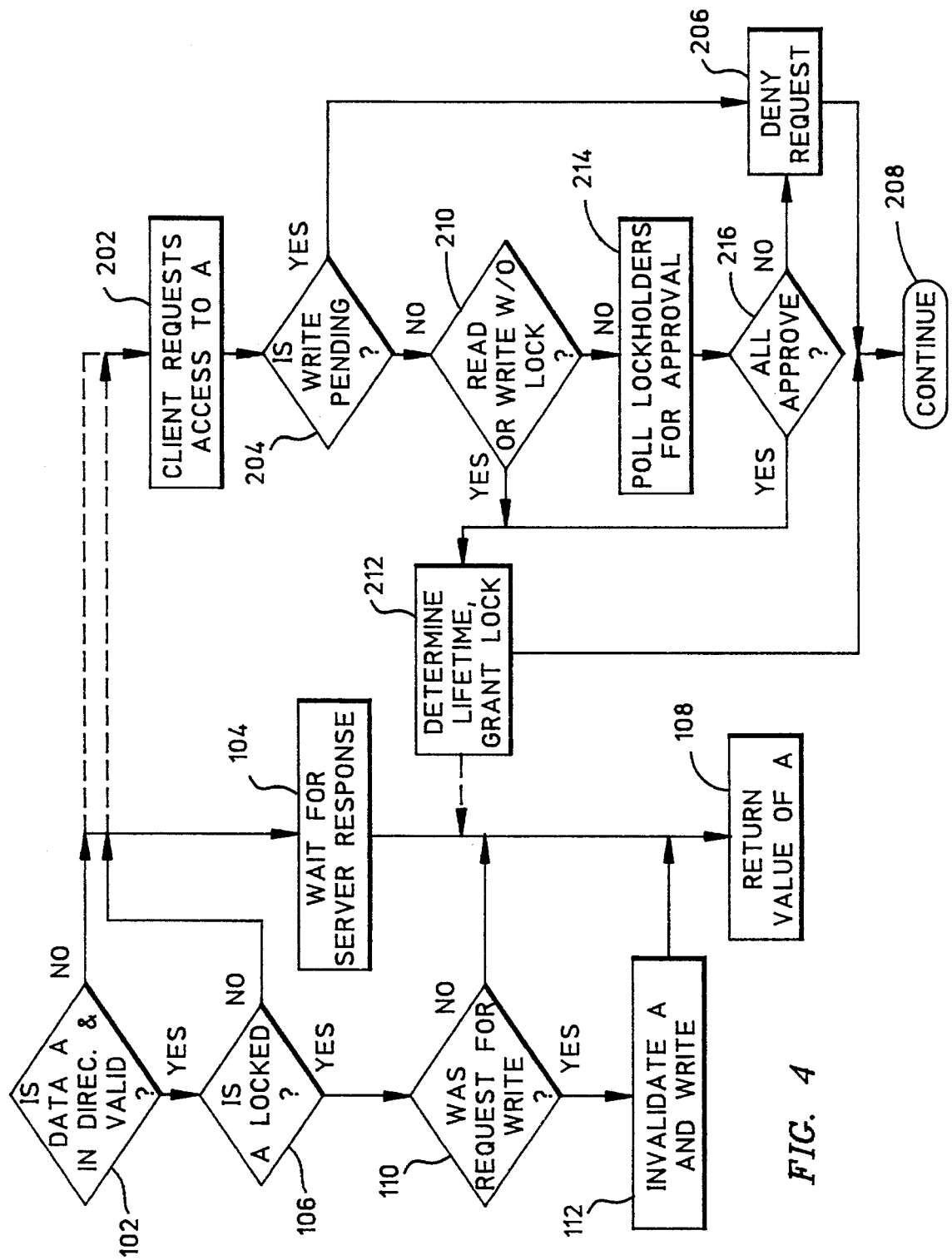
FIG. 4 is a flow diagram illustrating the operation of the system shown in FIGS. 1 and 2.

FIG. 4 is a flow diagram that illustrates the operation of a processing system constructed in accordance with the invention, beginning with a request by a client for access to a data object DATA A by Client i at the flow diagram box numbered 102. In FIG. 4, all flow diagram boxes beginning with the numeral "1" refer to steps taken by Client i, while all flow diagram boxes beginning with the numeral "2" indicate steps taken by the server.

At the decision box numbered 102, if the data object DATA A is not in the directory or is not valid, then Client i requests access to DATA A, as indicated by the dashed lines leading to the server diagram boxes, and the client waits for the server response, as indicated by the flow diagram box numbered 104. If the data object DATA A is in the local directory and is valid, then the client checks to see if it has a lock on DATA A at the box numbered 106. If the Client i does not have a data lock, then it requests access from the server and waits for a server response at the box numbered 104. If the client requested access at box 104, then processing is resumed at box 108 after the server response by returning the value of DATA A.

If Client i possessed an unexpired lock on DATA A, an affirmative response at the box numbered 106, then at box 110 Client i next checks to determine if the request for access involved a write operation. If it was not a write operation, that is, if the request was a read operation, then system processing resumes with the return of DATA A at box 108. If the request was for a write operation, then Client i invalidates the copy of DATA A and writes the new value in the local directory at the box numbered 112. Processing then resumes at box 108.

At the client server, the request from Client i for access to DATA A is received at the box numbered 202. The server first checks to determine if a write request is pending or if a write operation is in progress on DATA A at the box numbered 204. If either of these conditions is true, then the request for access to DATA A is denied at the box numbered 206 and processing is resumed with the continuation box numbered 208. If no write request was pending and no write operation was in progress at the box numbered 204, then at box 210 the server next checks to determine if the request from Client i involved either a read operation or a write operation with no current lockholder of DATA A. If either of these conditions is true, then the client server determines the appropriate lock lifetime and grants a data lock at the box numbered 212. Control then passes back to the client, as indicated by the dashed lines, and server processing continues at box 208 while Client i processing continues at 108.

If the outcome at decision box 210 of the server processing was negative, that is, if the request involved a write operation and there was at least one lockholder of DATA A, then the server next polls all lockholders for approval at box 214. Upon checking for approval responses at the box numbered 216, if the server finds that all lockholders do not approve, then the Client i request for access to DATA A is denied at box 206 and processing continues at box 208. If all lockholders grant approval at box 216, then the server determines the appropriate lock lifetime and grants the data lock at the box numbered 212 and control passes to Client i, as noted above.

As noted above, the client workstation can determine whether it will grant write approval based on various considerations. Among these are the needs of the client workstation for write operations of its own. For example, a file backup operation might trigger not only a disapproval of a request for write approval, but also might trigger a request for a lock renewal. If the client workstation determines that a lock renewal is needed, then it will signal the file server for a write approval from the other lockholders before its lock expires and will wait for a response. If approval is granted, then the file server will extend the lifetime of the data lock currently held by the client workstation.

It has been found through simulation that, for typical system configurations, the maximum benefit of variable lifetime locks is obtained where data locks have a lifetime of between five and twenty seconds. Analysis was directed to a single file server and its associated client workstations and the lock lifetimes were determined using the equation above, where lifetime t is defined by $t=1/(\alpha_r(f-1))$ and $f=2\alpha_r/N_s\alpha_w$. System parameters used in the analysis were an assumed file access rate a (comprising a file read access rate $\alpha_r$ and file write access rate $\alpha_w$) and file read-to-write ratio RW. In particular, a file access rate of 0.9 accesses per second was assumed. A read-to-write ratio of 21.6 was assumed, as was a message propagation time of 1.0 msec. Operating statistics were calculated according to the relationships $$\alpha_r=\alpha[RW/(RW+1)]$$

$$\alpha_w=\alpha[1/(RW+1)].$$

Figure 5:
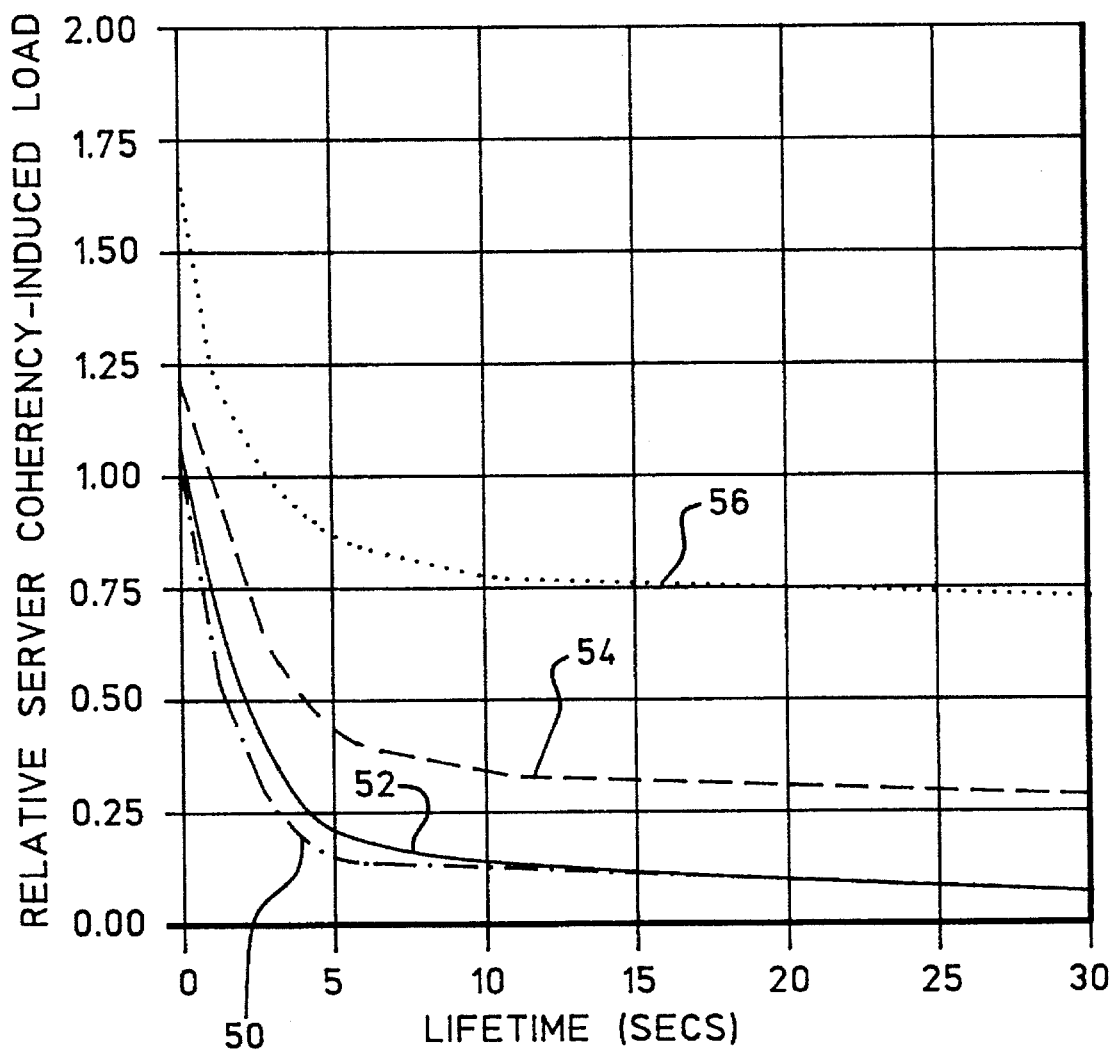
FIG. 5 is a graph of relative server coherency-induced load as a function of lock lifetime for a simulated system and static performance model.

FIG. 5 shows the relative server coherency load as a function of the lock lifetime for the simulated system. The first curve 50 was determined using a simulation of the cache and the server. The second curve 52 is for the case of only a single client having access to any one file. The third curve 54 shows the case where ten clients share a file and the fourth curve 56 is for the case where twenty clients share a file. FIG. 5 shows that most of the benefits of a non-zero variable lifetime lock are gained by a lifetime of a few seconds. For example, where a single client has access to a file, a term of ten seconds reduced the coherency traffic to 12% of that for a zero lifetime lock. The load for coherency must be considered, as it affects the total on the server. For example, for a zero lifetime lock, coherency accounted for 30% of the server traffic in the simulation. Hence, the actual benefit was a 26.4% reduction in total server traffic. This benefit leveled off to approximately 4.5% for a lock having an infinite lifetime. Thus, locks with longer lifetimes provide relatively little additional reduction in server load yet introduce all of the disadvantages of longer lifetime locks. Therefore, for the file access characteristics of the model, a lock with a short lifetime of approximately ten seconds appears to be a good choice, given the advantages of short lifetimes and the insignificant reduction in server load provided by locks of longer lifetimes.

Figure 6:
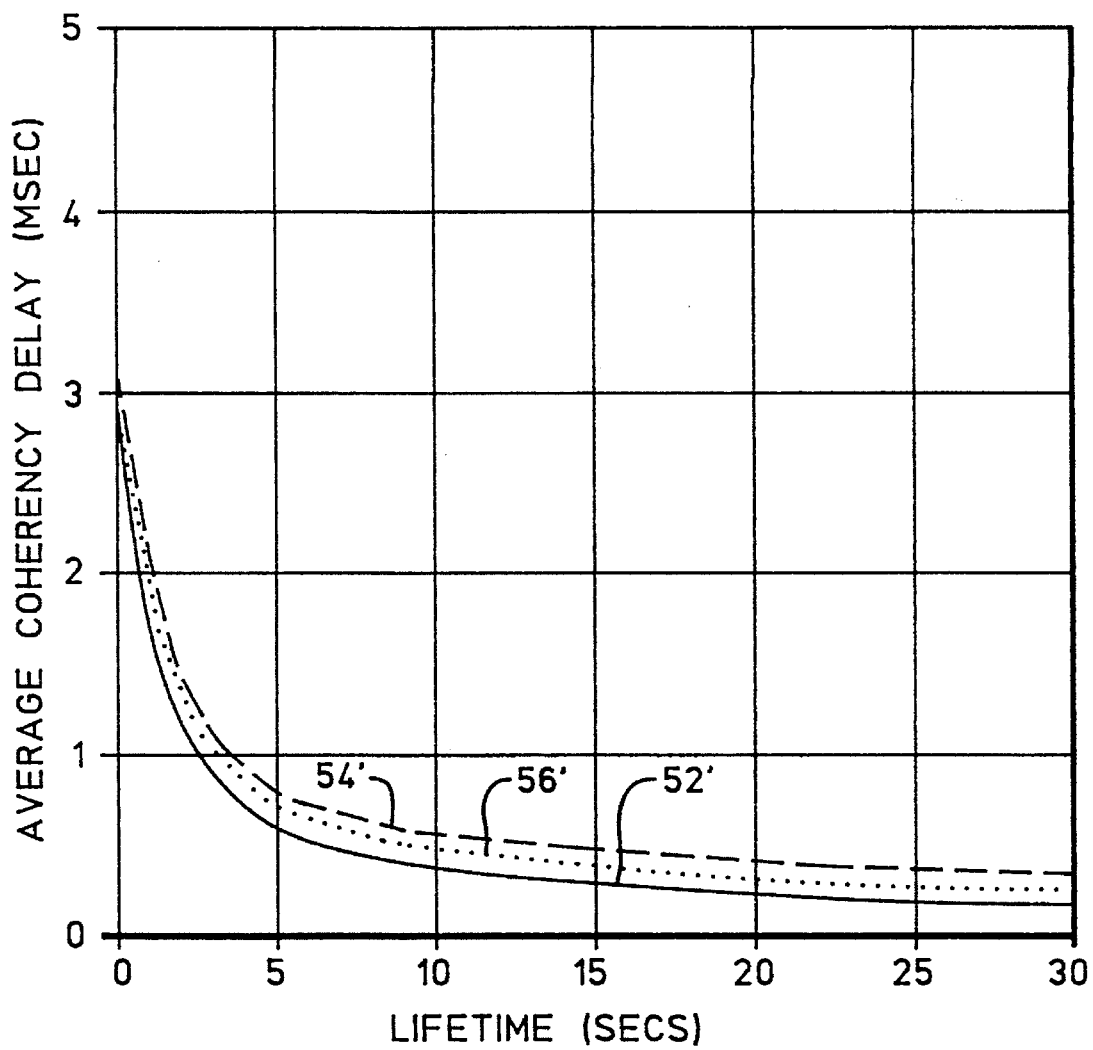
FIG. 6 is a graph of average coherency delay as a function of lock lifetime for the simulated system and static performance model associated with FIG. 3.

FIG. 6 shows the average delay added to each read or write operation by coherency as a function of the lock lifetime. Write operations are a small fraction of all operations, and therefore the delay added to shared write operations contributes little to the average delay, and the differences shown in the drawing among the curves for $N_s=1$ through $N_s=40$ are relatively insignificant. As with the FIG. 5 drawing, much of the benefit of variable lifetime locks can be gained with lock lifetimes in the five to ten second range.

In accordance with the invention, a method is provided for data management of a distributed file system in which client workstations can request access to data files and will be granted variable lifetime locks. The granting of variable lifetime locks permits tailoring of system dynamics to optimize data transmission in the system.

The present invention has been described above in terms of a presently preferred embodiment so that an understanding of the present invention can be conveyed. There are, however, many configurations for distributed file systems not specifically described herein, but with which the present invention is applicable. The present invention therefore should not be seen as limited to the particular embodiment described herein, but rather, it should be understood that the present invention has wide applicability with respect to distributed file systems generally. All modifications, variations, or equivalent arrangements that are within the scope of the attached claims should therefore be considered to be within the scope of the invention.

I claim:

1. A method of data management in a distributed file system having a file server adapted to store a plurality of data objects and respond to requests for read and write access to the data objects by granting and terminating data locks to the server-stored data objects, the system further having a plurality of interactive workstations that are adapted to operate in an active mode and in an idle mode, each workstation having a local cache memory; the method comprising the steps of:

receiving a request from a first workstation for read or write access to a data object;

determining an appropriate variable lock lifetime that expires in a range from zero to infinity seconds after grant, in response to the received request for access;

granting the first workstation a lock to the data object, the lock having the determined lock lifetime; and terminating the lock when the lock lifetime expires.

2. A method as recited in claim 1 wherein the step of determining an appropriate lock lifetime comprises considering the type of data object for which access is requested.

3. A method as recited in claim 1 wherein the step of determining an appropriate lock lifetime comprises considering the type of workstation requesting access to the data object.

4. A method as recited in claim 1, wherein the step of determining an appropriate lock lifetime comprises determining real-time system performance parameters and calculating an appropriate lock lifetime.

5. A method as recited in claim 1, wherein the workstations are further adapted to request renewal of a data lock prior to the expiration of the current data lock when the workstation determines that additional access to the data object is needed.

6. In a system having a file server storing a plurality of data objects and a plurality of interactive workstations accessing the server over a network, the server responding to requests for read and write access to the data objects from different workstations by granting and terminating data locks to the server-stored data objects, each workstation having a local cache and means for communicating access requests and the like to the server, each workstation adapted to operate in an active mode and an idle mode, a method for dynamically managing requests for access to the data objects comprising the steps of:

(a) responding to a request from a first workstation for access to a server-stored data object by either determining a variable lifetime for a lock and granting a first time-limited lock having the determined variable lifetime to the first workstation in the absence of contention among requests for access, or resolving contention among the requests by identifying a winning request and repeating step (a);

(b) responding to a request from a second workstation for access to the data object after the first time-limited lock has been granted to the first workstation, by either deferring the second station request for later resolution if the first station is in the idle mode, or suspending the second station request until the current lock expires if the first workstation is in the active mode, the first workstation resolving a deferred second station request that is valid only within its time duration lock by either granting or denying access to the second workstation; and (c) responding to a request from the first workstation for a second lock on the data object requested during the pendency of the first time-limited lock by repeating step (a).

7. A method according to claim 6, wherein step (b) further includes invalidating any image of the first object that is resident in the local cache of the first workstation upon the current lockholder granting the second workstation a write access to the first data object.

8. A method according to claim 6, wherein the local caches are of the write-through type such that any write update made by the first workstation during the pendency of the data lock to an image of the first data object residing in its local cache would be written through to the file server.

9. A method according to claim 6, wherein the method further comprises the step of inhibiting any access by the first workstation of any image of the data object residing in its local cache in the absence of a lock granted by the server or an access granted by the current lockholder.

10. A method according to claim 6, wherein the step of responding to a request from the first workstation further comprises resolving contention among at least two concurrent non-lockholders on a predetermined priority basis and among multiple requesters within the same predetermined priority on a first-come, first-served basis.

11. A distributed file computing system having a central processor connected to a plurality of file servers adapted to store a plurality of data objects and respond to requests for read and write access to the data objects by granting and terminating data locks to the server-stored data objects, each of the file servers being connected to a plurality of client workstations that request access to the data objects and are adapted to operate in an active mode and an idle mode, each workstation having a local cache memory; wherein:

the file servers grant data locks having variable lifetimes in a range from zero seconds to infinity seconds, the particular lock lifetime for a requested data object being determined in response to a request for access as a function of at least one of the system read/write ratio, file access rate, the number of workstations served by a file server, number of workstations sharing the data object, the type of request for access, the type of data object for which access is requested, or the type of workstation requesting access.

12. A system as defined in claim 11, wherein the determination is made assuming static values for system operating statistics including read/write ratio, access rate, and number of workstations sharing a server or data object.

13. A system as defined in claim 11, wherein one or more of the system parameters upon which the lock lifetime is based is dynamically determined at approximately the time of the request.

14. A system as defined in claim 11, wherein the client workstations are adapted to request renewal of a data lock prior to the expiration of a currently held data lock when the workstation determines that additional access to the data object is needed beyond expiration of the data lock.

15. A program product data storage device, tangibly embodying a program of machine-readable instructions executable by a computer to perform method steps for managing a distributed file system having a file server adapted to store a plurality of data objects and respond to requests for read and write access to the data objects by granting and terminating data locks to the file server-stored data objects, the distributed file system further having a plurality of interactive workstations that are adapted to operate in an active mode and in an idle mode, each workstation having a local cache memory; the method steps performed by the computer comprising the steps of:

receiving a request from a first workstation for read or write access to a data object;

determining an appropriate variable lock lifetime that expires in a range from zero to infinity seconds after grant, in response to the received request for access;

granting the first workstation a lock to the data object, the lock having the determined lock lifetime; and terminating the lock when the lock lifetime expires.

16. A program storage device as defined in claim 15, wherein the step of determining an appropriate lock lifetime comprises considering the type of data object for which access is requested.

17. A program storage device as defined in claim 15, wherein the step of determining an appropriate lock lifetime comprises considering the type of workstation requesting access to the data object.

18. A program storage device as defined in claim 15, wherein the step of determining an appropriate lock lifetime comprises determining real-time system performance parameters and calculating an appropriate lock lifetime.

19. A program storage device as defined in claim 15, wherein the workstations are further adapted to request renewal of a data lock prior to the expiration of the current data lock when the workstation determines that additional access to the data object is needed.

* * * * *